United States Patent [19]

Pellegrino et al.

[11] Patent Number: 5,417,832
[45] Date of Patent: May 23, 1995

[54] ENHANCING PERFORMANCE OF PERFLUORINATED IONOMER MEMBRANES VIA DOPANT INCORPORATION, METHOD OF MAKING THEREOF AND THE MEMBRANE

[75] Inventors: John Pellegrino; Richard D. Noble; Robert Rabago, all of Boulder; Carl Koval, Golden, all of Colo.

[73] Assignee: The University of Colorado Foundation, Inc., Boulder, Colo.

[21] Appl. No.: 935,016

[22] Filed: Aug. 25, 1992

[51] Int. Cl.[6] .............................................. C25B 13/08
[52] U.S. Cl. ..................................... 204/296; 521/27; 264/331.14
[58] Field of Search .................. 204/296; 264/331.11, 264/331.13, 331.14, 331.15, 331.18; 521/27

[56] References Cited

U.S. PATENT DOCUMENTS 4,678,581  7/1987  Nogi et al. ...................... 210/500.35
4,738,764  4/1988  Chlanda et al. ................. 264/331.15

FOREIGN PATENT DOCUMENTS 53-139357  11/1978  Japan .
61-283935   5/1980  Japan .

*Primary Examiner*—Kathryn Gorgos
*Attorney, Agent, or Firm*—Swanson & Bratschun

[57] ABSTRACT

The present invention describes a perfluorinated ionomer membrane having a improved transport characteristics. A surfactant species is added to a polymer mixture prior to film casting. The resulting membranes have a measurably altered membrane microstructure and improved transport characteristics over prior art membranes. The present invention describes the method of producing the improved membranes. The membranes of the present invention are useful in a number of separation processes, including the separation of $NH_3$ from gaseous and liquid mixtures, in the production of NaOH and $Cl_2$ gas from the electrolytic dissolution of NaCl, in the separation of toxic and radioactive metals from aqueous streams, and in solid polymer electrolyte $H_2/O_2$ fuel cells.

21 Claims, 2 Drawing Sheets

ENHANCING PERFORMANCE OF PERFLUORINATED IONOMER MEMBRANES VIA DOPANT INCORPORATION, METHOD OF MAKING THEREOF AND THE MEMBRANE

FIELD OF THE INVENTION

This invention relates to polyperfluorosulfonic acid (PFSA) separation membranes. Specifically, dopant molecules are used to modify the polymer structure of PFSA to improve the separation properties of the resulting membrane while retaining the characteristics of high mechanical strength, hydrophilicity, solvent and temperature resistance, and crystallinity. The membranes of the present invention are useful in a number of separation processes, including the separation of $NH_3$, $CO_2$, and $H_2S$ from gaseous and liquid mixtures, in the production of NaOH and $Cl_2$ gas from the electrolytic dissolution of NaCl, and the separation of toxic and radioactive metals from aqueous streams. The membranes are also useful in solid polymer electrolyte $H_2/O_2$ fuel cells.

BACKGROUND OF THE INVENTION

The use of an ion-exchange membrane as a support for facilitated transport offers several important advantages over other methods of separation: (1) in an ion-exchange membrane, the complexing agent is held in the membrane by electrostatic forces and cannot be leached out; (2) the concentration of complexing agent in the membrane is determined by ion-exchange site density and not physical solubility. The ion-exchange site density is normally much larger than the physical solubility; (3) the high charge density in the vicinity of the ion-exchange sites protects the complexing agent from redox reactions and extends its useful lifetime; and (4) solvent loss problems are reduced. The complexing agent is not removed if the solvent phase is removed. The membrane can be resolvated without a reduction in subsequent performance.

Ionomers are polymeric materials containing ionic groups. Most of the research effort on ionomers has focused on only a small number of materials such as ethylenes, styrenes, rubbers, and fluorocarbon-based ionomers. Because of a high water permeability and cation selectivity, fluorocarbon-based ionomers have been used as ion-exchange membranes (Kyu (1985) in Materials Science of Synthetic Membranes, D. R. Lloyd, ed. (American Chemical Society, Washington, D.C.), pp. 365–405). Perfluorinated ion-exchange membranes are derived from copolymers of tetrafluoroethylene (TFE) and a perfluorovinyl ether terminated by a sulfonyl fluoride group. Examples of perfluorinated ion-exchange membranes include Nafion ® (E. I. du Pont de Nemours), Femion ® (Asahi Glass Co., Ltd.), and Neosepta-F ® (Tokuyama Soda Co. Industry Company) (Kyu (1985) supra).

Perfluorinated ionomer membranes are characterized by high chemical and thermal stability and strength, high water permeability, and cation permselectivity. These characteristics make them ideal membranes in many separation applications (Kyu (1985) supra). Perfluorinated ionomer membranes are widely used in chlor-alkali cells, water electrolyzers, batteries, and fuel cells (Kipling (1982) in Perfluorinated Ionomer Membranes, A. Eisenberg and H. L. Yeager, eds. (American Chemical Society, Washington, D.C.) pp. 475–487). They have been used in a number of nonelectrochemical applications including chemical separations, organic syntheses, and catalytic systems (Moore and Martin (1988) Macromolecules 21:1334–1339).

Perfluorinated ionomer membranes contain carbon backbones made up of fluorocarbon chains. Ionic groups are connected to the backbone through side chains. The side chains can terminate in a variety of ionic groups, including sulfonic acid, carboxylic acid, sulfonium, or quaternary ammonium (Fujimura et al. (1981) Macromolecules 14:1309–1315). In the case of an acidic side chain, the locations of the anions are fixed whereas the cation can transport through the polymer.

Nafion ®, manufactured by E. I. du Pont de Nemours, is a cation exchange membrane that consists of a fluorocarbon backbone with fluorocarbon sidechains (Besso and Eisenberg (1981) in Proceedings of the Symposium on Ion Exchange Transport and Interfacial Properties, R. S. Yeo and R. P. Buck, eds. (Electrochemical Society, Pennington, N.J.), pp. 197–209; Yeager and Eisenberg (1982) in Perfluorinated Ionomer Membranes, A. Eisenberg and H. L. Yeager, eds. (American Chemical Society, Washington, D.C.), pp. 1–6). Thin Nafion ® films are particularly effective for the selective passage of water, cations, and water-soluble molecules, and as supports for facilitated transport separations. A primary application for Nafion ® membranes is in the chlor-alkali industry (Yeager and Steck (1981) J. Electrochem. Soc. 128:1880–1884; Yeager and Eisenberg (1982) supra). Nafion ® has also been used as a solid polymer electrolyte in an experimental photoelectrochemical cell (Sammells and Schmidt (1985) J. Electrochem. Soc. 132:520–522), and in a zinc bromide ($ZnBr_2$) battery (Lim et al. (1977) J. Electrochem. Soc. 124:1154–1157; Will (1979) J. Electrochem. Soc. 126:36–42). A major limitation to more widespread use of Nafion ® is its high resistance to mass transport through the polymer structure.

Because of the technological importance of the perfluorinated ionomers, their microscopic structure and the relationship of structure to membrane transport properties have been extensively studied (Yeager and Steck (1981) supra; Yeager et al. (1982) J. Electrochem. Soc. 129:85–89; Yeo (1983) J. Electrochem. Soc. 130:533–538; Fales et al. (1986) in Proceedings of the Symposium on Engineering of Industrial Electrolytic Processes (Electrochemical Society, Pennington, N.J.), pp. 203–218; Sakai et al. (1986) J. Electrochemical Soc. 133:88–92; Fujimura et al. (1981) supra; Gierke et al. (1981) J. Polym. Sci. Polym. Phys. Ed. 19:1687–1704). Among the techniques used to probe different aspects of the structural features of perfluorinated ionomer membranes are small angle X-ray scattering, small angle neutron scattering, quasi-elastic neutron scattering, infrared nuclear magnetic resonance, and Mossbauer spectroscopy (Yeager and Eisenberg (1982) supra).

Small angle X-ray scattering (SAXS) is a technique for studying material structural features that are on the order of a few nanometers in size (Kratky (1982) in Small Angle X-Ray Scattering, O. Glatter and O. Kratky, eds. (Academic Press, New York), Chapter 1). Any material with at least two phases having different electron densities will give a scattering pattern which is dependent on the shape and dimensions of the different regions (Porod (1982) in Small Angle X-ray Scattering, O. Glatter and O. Kratky, eds. (Academic Press, New York), Chapter 2). Electron density is defined as the moles of electrons per unit volume where each electron is a possible scattering sight for X-rays.

For perfluorinated ionomers, a significant electron density difference between the ionic cluster and surrounding fluorocarbon region has been estimated (Roche et al. (1981) J. Polym. Sci. Polym. Phys. Ed. 19:1–11), supporting the idea that the PFSA microstructure contains at least two separate domains (Gierke et al. (1982) in Perfluorinated Ionomer Membranes (American Chemical Society, Washington, D.C.) pp. 195–216). One domain is composed primarily of the hydrophobic fluorocarbon backbone. A second domain contains ion-exchange sites that are part of the polymer backbone, called ionic clusters. A third domain is the interfacial region containing some side chain materials, small amounts of water, some sulfonate sites with cations and a relatively large fractional void volume.

Ionic clusters are formed by the grouping of ionic sulfonate groups within the polymer (Roche et al. (1981) supra; Yeo and Cheng (1986) J. Appl. Polym. Sci. 32:5733–5741) and are small regions where ionic chemistry dominates. The average size of ionic clusters within Nafion ® membranes has been estimated to be on the order of 40–50 Å (Gierke et al. (1981) supra; Kyu (1985) supra). The ionic clusters may be linked by channels forming a network throughout the membrane. As with all ionomers, the sidechains are permanently attached to the polymer backbone at random intervals. The side chains are relatively immobile, but the counterion is free to move. Counterion motion makes these polymers ionic conductors. Specific molecules, which are polar or charged, can easily diffuse through a film of PFSA by way of the ionic cluster channels.

Efforts have been made to modify the basic Nafion ® homogeneous polymer film to produce materials with special characteristics, including lamination of fabric to the polymer film to increase its strength, composite membranes made up of layers of different equivalent weights of polymer film laminated together to increase anion rejection, and surface treatment to improve hydroxide ion rejection (Yeager and Eisenberg (1982) supra).

The literature also contains numerous reports of structural and morphological modifications to PFSA polymers and film-casting strategies that attempt to improve the productivity of cast membranes (Moore and Martin (1988) supra and (1986) Anal. Chem. 58:2569; Liu and Martin (1990) J. Electrochem. Soc. 137:3114; Gebel et al. (1987) Macromolecules 20:1425–1428; Heaney and Pellegrino (1989) J. Memb. Sci. 47:143–161). For example, Dow Chemical Corporation has a commercially available polyperfluorosulfonic acid (PFSA) material of substantially lower equivalent weight than Nafion ® (U.S. Pat. No. 4,417,969 of Ezzell et al., issued Nov. 29, 1983). Equivalent weight is defined as the grams of polymer per one mole of ion exchange sites when the ionomer is in the acid form and dry (Yeager and Eisenberg (1982) supra). Low equivalent weight indicates a high density of ion-exchange sites per unit mass and often correlates well with lower mass transfer resistance (Gierke and Hsu (1982) supra; Yeo (1982) supra). Another report describes a procedure of heat treating Nafion ® films that results in significantly increased permeability (Pellegrino et al. (1988) Gas Sep. and Purif. 2:126–130). Casting strategies such as forming very thin PFSA films on hollow fibers and other substrates to take advantage of more effective geometries also exist (U.S. Pat. No. 4,469,744 of Grot et al., issued Sep. 4, 1984). Attempts to increase the productivity of PFSA films often results in many of the advantageous chemical and physical properties being compromised.

Two attempts to provide improved separator materials have included the use of a surfactant species in the polymer formation process. U.S. Pat. No. 4,289,600, issued Sep. 15, 1981, to Lazarz et al. describes a microporous electrolytic cell separator produced from a mixture of polytetrafluoroethylene (PTFE), a particulate pore-forming material, and an organic fluorinated surfactant. The surfactant is added up to 50% by weight in an isopropanol-water solution to aid the blending of the PTFE and pore-forming material by lowering surface tension. However, the surfactant of the Lazarz et al. membrane is not incorporated into the polymer structure nor does it alter the membrane microstructure. Further, the surfactant does not improve membrane transport characteristics since the permeability of the Lazarz membrane results from addition of pore-forming particulate material.

U.S. Pat. No. 4,741,744, issued May 3, 1988 to Wu et al. also describes a PFSA membrane with improved permeability characteristics produced from perfluorinated polymers containing pendant hydrated metal ionomer moieties. The Wu et al. membrane is produced by an emulsion polymerization of one or two types of monomers, a free radical initiator, a buffer and a fluorinated surfactant. The surfactant is used to aid in the polymerization process. The polymer formed is used to make membranes by a multitude of techniques, including casting films from solutions. The role of the surfactant in the Wu membrane specifically functions to form micelles in which polymerization takes place and to stabilize the polymer emulsion in the latex form throughout the reaction rather than to alter membrane microstructure so as to enhance membrane transport characteristics.

The present invention describes the production of improved ionomer membranes from PFSA solutions that retain the desirable characteristics of high mechanical strength, high hydrophilicity, high solvent and temperature resistance, and high crystallinity, while having improved transport properties relative to membranes described in the prior art. This improvement is achieved by the addition of a surfactant species to the PFSA polymer solution prior to casting the polymer film, resulting in a membrane with a measurably altered membrane microstructure and improved transport characteristics.

The improved membrane characteristics of the present invention may result from a number of possible routes. The presence of surfactant in the polymer solution may alter the internal microscopic structure of the membrane film, resulting in an improved polymer film morphology. The altered film morphology may be maintained with or without the persistant inclusion of the surfactant in the final membrane. If the surfactant persists in the final film, an improvement in the transport properties may result by interactions which include the surfactant. These include more ion-exchange sites for solvent, carriers, counterions, and transporting solutes.

BRIEF SUMMARY OF THE INVENTION

A variety of dopant species have been added to a PFSA polymer solution (Nafion ®) prior to film casting. The resulting film membranes have improved microstructural crystallinity, decreased equivalent weights, and improved transport properties.

The membranes of the present invention are useful in a number of ways, including: in the production of NaOH and $Cl_2$ gas from the electrolytic dissolution of NaCl, the dehydration of gases used in medical and industrial processes, the separation of $NH_3$, $CO_2$, and $H_2S$ from gaseous and liquid mixtures, the separation of acid gases from natural gas, the separation of water from alcohols and other organic solvents, including the separation of azeotropic compositions, the separation of olefin/saturate, olefin/olefin, and olefin isomer separations, electrodialytic separation of toxic and radioactive metals from aqueous streams, separation of organic liquids from each other for waste minimization and recycle, coatings on protective garments to guard against chemical and biological agents, and ion-specific coatings on electrochemical sensors. Further, the membranes of the present invention are useful in solid polymer electrolyte $H_2/O_2$ fuel cells.

DETAILED DESCRIPTION OF THE PREFERRED EMBODIMENTS

Figure 1:
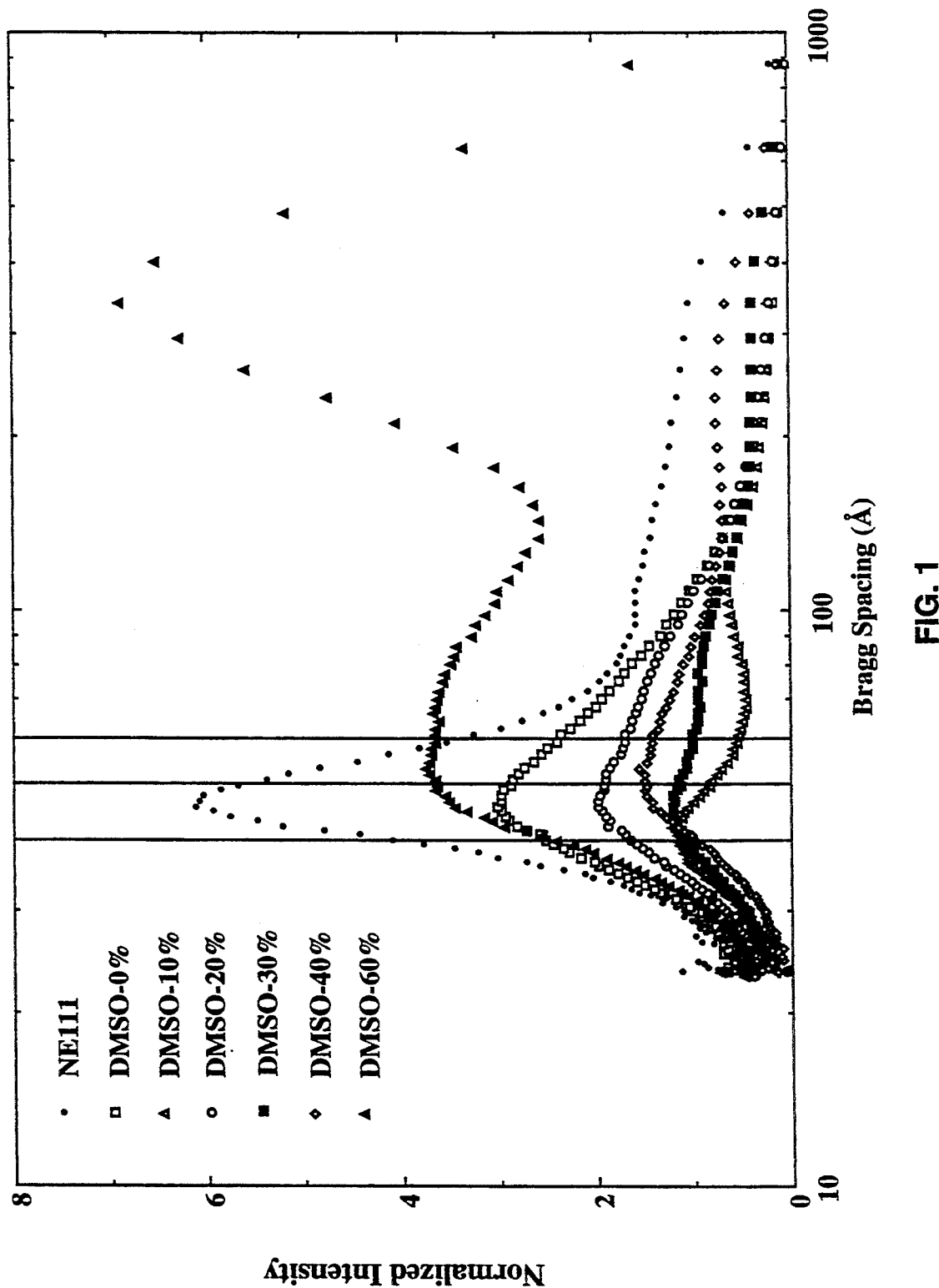
FIG. 1 shows the Lorentz-corrected X-ray scattering intensity for membranes made with DMSO as the casting solvent and FC95 as the dopant.

The present invention describes an ion-exchange membrane with improved transport and permselectivity characteristics. The membrane of the present invention is achieved by the addition of surfactant species to the polymer solution prior to film casting. The resulting film membranes have a membrane microstructure with measurably altered membrane microstructure and exhibit improved transport characteristics. The membranes of the present invention are useful in a number of separation processes, including the separation of $NH_3$, $CO_2$, and $H_2S$ from gaseous and liquid mixtures, in the production of NaOH and $Cl_2$ gas from the electrolytic dissolution of NaCl, and the separation of toxic and radioactive metals from aqueous streams.

The term "dopant" as used in the present disclosure refers to the surfactants mixed with the polymer solution, and the term "doped membranes" refer to the membranes formed from the polymer solution to which a surfactant species has been added. The doped membranes exhibit an altered microstructure resulting in improved transport properties. In some but not all cases, the doped membrane retains the dopant material.

The present invention discloses the use of ammonium perfluoro-octane sulfonate (FC93), potassium perfluorooctane sulfonate (FC95), potassium perfluoroalkylcyclohexyl sulfonate (FC98), sodium butane sulfonate ($ButSO_3Na$), and sodium octane sulfonate ($OctSO_3Na$) as surfactant species added to the polymer solution prior to formation of the film membrane. In the preferred embodiment the dopant is a surfactant, and in the most preferred embodiment the dopant is a sulfonate. The present invention encompasses use of other surfactant molecules, the selection of which will be obvious to one skilled in the art as a result of this disclosure. The present invention discloses use of surfactant molecules resulting in a concentration of up to 60 mol % (as a percentage of total solids) in the cast membrane.

The term "polymer solution" as used in the present disclosure refers to the mixing of pre-formed, soluble polymer (not monomers) materials, solvents and additives, not restricted to but including surfactants and organic salts. In a preferred embodiment the polymer solution is comprised of a 5% PFSA (Nafion ®, 1100 equivalent weight, obtained commercially as a 5% weight/weight (w/w) solution in light alcohols and ethers) diluted to between 0.5-5% (w/w) in a solvent. Upon evaporation of the solvent from the polymer solution, a membrane film is formed. The term "evaporation" as used in the present disclosure refers to the formation of a solid film from the polymer solution by a number of means including lowering the pressure and heating. Upon curing, which may be simultaneous with evaporation or subsequent to it, the polymer film is rendered mostly insoluble in common solvents (including those used in the original polymer solution). This insolubility persists at the temperatures and pressures that are likely to be encountered in current uses of the membrane film. "Curing" entails heating of the polymer film for 30 minutes or more at temperatures of 90° C. or more. Curing is thought to involve the formation of crystalline regions within the region. This is commonly referred to as physical crosslinking, as differentiated from chemical crosslinking. The present invention encompasses use of other methods of curing a membrane film known to those skilled in the art, and will depend on specific experimental objectives.

In the present invention, the polymer material and the surfactant are dissolved in a number of solvents, including dimethyl sulfoxide (DMSO), dimethylformamide (DMF), and methanol (MeOH). The invention encompasses the use of other appropriate solvents, the selection of which will become apparent to those skilled in the art as a result of the present disclosure. For example, Nafion ® comes as a 5% solution in light alcohols, water, and ethers.

Perfluorinated ion-exchange membranes are thought to contain at least two domains. One domain is a cluster which contains ion-exchange sites that are connected to the polymer backbone, called ionic clusters. A second domain is primarily fluorocarbon, throughout which are distributed the ionic clusters. Polar or charged molecules diffuse through the membrane by way of the ionic clusters. The speed of their diffusion depends on their ability to move from one cluster to another through the fluorocarbon region. The movement from one cluster to another can be made faster by several means, including decreasing the distance between clusters, and providing some ion exchange sites in the intervening fluorocarbon region. The presence of dopants in the formation of the membranes of the present invention result in faster permeation of diffusant molecules. Although not limited by theory, this may result from a dopant-induced increase in the size of the ionic clusters, thereby decreasing the distance between them. The dopants may also increase the diffusion of specific molecules through the membrane by an altered distribution of ionic pockets throughout the fluorocarbon region. Also, the dopants may alter the free volume of intervening interfacial regions between ionic clusters.

The preferred method of making the improved membranes of the present invention is as follows:

1) PFSA [Nafion ®, 1100 equivalent weight (EW)] is obtained commercially as a 5% (w/w) solution in light alcohols and ethers. The solution is diluted to between 0.5-5% (w/w) polymer in a solvent, such as dimethyl sulfoxide (DMSO), neutralized with an equivalent amount of sodium hydroxide, and heated to eliminate all solvents except DMSO;

2) A dopant species, such as ammonium perfluorooctane sulfonate (FC93), potassium perfluoro-octane sulfonate (FC95), potassium perfluoro-alkylcyclohexyl sulfonate (FC98), sodium butane sulfonate (ButSO$_3$Na), and sodium octane sulfonate (OctSO$_3$Na), is prepared as a dilute solution (0.1%–3%) in the solvent;

3) The above two solutions are mixed in proportions to give a specific ratio of dopant to polymer. The concentration of dopant plus polymer is adjusted to 1% and the solution delivered to a glass casting dish;

4) The polymer-surfactant solution may be allowed to evaporate to dryness or the casting dish may be placed in an oven and heated to 175° C. for 2 hours resulting in a thin, dry membrane film.

The resulting membrane film contains 40–100 mol % polymer and 0–60 mol % surfactant (both as a percentage of total solids). In the preferred embodiment of the invention, the membrane film is comprised of between 1–60 mole % surfactant. In the most preferred embodiment, the membrane film is comprised of more than 10 mole % surfactant. The membrane film may be used directly or detached from the glass surface by rinsing with warm water.

The described general procedure results in high quality membranes with improved transport properties. However, the described procedure is by no means the only method for producing PFSA membranes of increased productivity by addition of surfactant molecules. It is envisioned that other methods of producing the membranes of the present invention will be obvious to those skilled in the art as a result of the present disclosure. It is envisioned that, as a result of the present invention, other casting solvents and other surfactant-type dopant molecules would be effective in improving PFSA film productivity.

It is to be understood that both the foregoing general description and the following detailed description are exemplary and explanatory only, and are not restrictive of the invention, as claimed.

Example 1 describes general methods known to the art for casting membranes. The present invention encompasses other methods known to the art for membrane formation, the selection of which will depend on the specific type of membrane required in each specific case.

Example 2 describes the conditions under which SAXS profiles were obtained for several doped membranes. The results indicate that the presence of dopant added prior to membrane formation causes the semicrystalline ionic cluster regions to achieve a more ordered arrangement within the membrane microstructure.

Example 3 describes the equivalent weight determinations conducted with doped and undoped membranes. The results show that the addition of dopant to the polymer solution prior to membrane formation results in membranes with a lower equivalent weight.

Example 4 describes vapor phase permeation measurements conducted with doped and undoped membranes. The results show that doped membranes are significantly more permeable to water.

Example 5 describes experiments correlating the observed SAXS data with water or isopropanol permeation for membranes made up with DMSO or MEOH as the added solvent and varying percentages of FC-95 dopant. The results show that the best permselectivity was achieved with membranes composed of 10% and 20% dopant.

EXAMPLE 1

General Methods for Casting Membranes

General methods for casting membranes are well known to those of ordinary skill in the art. Kesting (1985) in Materials Science of Synthetic Membranes, D. R. Lloyd, ed. (American Chemical Society, Washington, D.C.) pp. 131–164, specifically incorporated herein by reference, describes several methods of casting membranes, including the evaporative technique herein described. The invention encompasses other methods of forming membranes from solutions known to the art (U.S. Pat. No. 4,908,235).

Nafion ® polymer is commercially available as a 5% solution in mixed light alcohols, primarily isopropanol. This solution is diluted in a secodary casting solvent containing the surfactant, and the resulting mixture is evaporated to dryness. Heating of the resulting solid film creates an insoluble membrane.

Specific Casting Conditions

In one embodiment of the invention, a 4.32% solution of FC-95 in MeOH was added to the 5% Nafion ® solution in a quantity such that the mol % of solids contributed by the surfactant was up to 40 mol %. Sufficient additional MeOH was then added to bring the total percent solids of the casting solution to about 1.7%. The membranes were allowed to evaporate overnight at ambient temperature and pressure in a glass dish.

In another embodiment of the present invention, a 4.23% solution of FC-95 in DMSO was added to the 5% Nafion ® solution in a quantity such that the mol % of solids contributed by the surfactant was up to 60 mol %. Sufficient MeOH was then added to bring the total percent solids of the casting solution to about 1.7%. The membranes were allowed to evaporate at 308K (35° C.) and 3 torr in a glass dish.

The dry films were either used directly or were hydrated with water and easily lifted off the casting dish. The membranes were heated for 1 hr at 373 K (100° C.). The resulting films were insoluble in aqueous solvent. The solids mass in each film was nominally 0.218 g and the thickness about 25 μm.

Table 1 lists samples of membranes formed by the methods herein described. The PFSA was diluted in one of three solvents: dimethylsulfoxide (DMSO), dimethylformamide (DMF), or methanol (MeOH). The pressure and temperature at which the solvent was evaporated to produce the film was either ambient pressure and temperature (84 kPa and 22° C.)("amb"), or evacuation in a vacuum oven to 8 kPa ("vac"). The surfactants added to the casting solution where one of the following: $CF_3$—$(CF_2)_7$—$SO_3K$ ("FC95"), $CF_3$—$(CF_2)_7$—$SO_3NH_4$ ("FC93"), $CH_3$—$(CH_2)_3$—$SO_3Na$ ("ButSO$_3$"), or $CH_3$—$(CH_2)_7$—$SO_3Na$ ("OctSO$_3$"). The percent solids at casting is the percent weight of PFSA plus the surfactant in the casting solution. The dopant mole fraction is the mole fraction of dopant based on total solids.

TABLE 1

Samples of Doped PFSA Membranes

| Sample | Solvent | Pres/Temp. | Dopant | % Solids | Dopant Mole Fraction |
|---|---|---|---|---|---|
| 10301 | DMSO | vac/35 | FC95 | | 0.1 |
| 10501 | DMSO | vac/35 | FC95 | | 0.6 |
| 10703 | DMSO | vac/35 | FC95 | 1.66 | 0.2 |
| 11201 | DMSO | vac/35 | FC95 | 1.65 | 0.4001 |
| 11901 | MEOH | amb | none | 1.67 | 0.00 |
| 11902 | MEOH | amb | FC95 | 1.87 | 0.198 |
| 12001 | DMSO | vac/35 | none | 1.67 | 0.00 |
| 12002 | MEOH | amb | FC95 | 2.78 | 0.398 |
| 12101 | DMSO | vac/35 | FC95 | 2.87 | 0.597 |
| 22501 | DMSO | amb/165 | none | 0.925 | 0.00 |
| 22502 | DMSO | amb/165 | none | 0.931 | 0.00 |
| 22503 | DMSO | amb/165 | FC95 | 0.89 | 0.399 |
| 22504 | DMSO | amb/165 | FC95 | 0.892 | 0.398 |
| 42301 | DMF | vac/23 | none | 1.00 | 0.00 |
| 42501 | DMF | vac/23 | FC95 | 1.7 | 0.414 |
| 42601 | DMF | vac/23 | FC95 | 1.5 | 0.206 |
| 51301 | DMF | amb/135 | none | 1.0 | 0.00 |
| 51302 | DMF | amb/135 | FC95 | 1.0 | 0.199 |
| 51303 | DMF | amb/135 | FC95 | 1.0 | 0.308 |
| 51304 | DMF | amb/135 | FC98 | 1.0 | 0.2 |
| 51305 | DMF | amb/135 | FC98 | 1.0 | 0.301 |
| 51306 | DMF | amb/135 | FC93 | 1.0 | 0.205 |
| 51307 | DMF | amb/135 | FC93 | 1.0 | 0.3 |
| 51308 | DMF | amb/135 | BuSO$_3$Na | 1.0 | 0.198 |
| 51309 | DMF | amb/135 | BuSO$_3$Na | 1.0 | 0.298 |
| 51310 | DMF | amb/135 | OctSO$_3$Na | 1.0 | 0.209 |
| 51311 | DMF | amb/135 | OctSO$_3$Na | 1.0 | 0.3 |
| 51401 | DMF | vac/23 | none | 3.0 | 0.00 |
| 51402 | DMF | vac/23 | FC93 | 3.0 | 0.207 |
| 51403 | DMF | vac/23 | FC93 | 3.0 | 0.3 |
| 51404 | DMF | vac/23 | FC95 | 3.0 | 0.199 |
| 51405 | DMF | vac/23 | FC95 | 3.0 | 0.299 |
| 51406 | DMF | vac/23 | FC98 | 2.9 | 0.202 |
| 51407 | DMF | vac/23 | FC98 | 2.8 | 0.3 |
| 51408 | DMF | vac/23 | BuSO$_3$Na | 2.7 | 0.198 |
| 51409 | DMF | vac/23 | BuSO$_3$Na | 2.4 | 0.3 |
| 51410 | DMF | vac/23 | OctSO$_3$Na | 2.9 | 0.202 |
| 51411 | DMF | vac/23 | OctSO$_3$Na | 2.7 | 0.3 |
| 52301 | DMF | vac/23 | none | 1.0 | 0.00 |
| 52302 | DMF | vac/23 | none | 1.0 | 0.00 |
| 52303 | DMF | vac/23 | FC93 | 1.0 | 0.2 |
| 52307 | DMF | vac/23 | FC95 | 1.0 | 0.2 |
| 52308 | DMF | vac/23 | FC95 | 1.0 | 0.2 |
| 52309 | DMF | vac/23 | FC95 | 1.0 | 0.31 |
| 52310 | DMF | vac/23 | FC95 | 1.0 | 0.3 |
| 52311 | DMF | vac/23 | FC98 | 1.0 | 0.21 |
| 52312 | DMF | vac/23 | FC98 | 1.0 | 0.21 |
| 52313 | DMF | vac/23 | FC98 | 1.0 | 0.3 |
| 52314 | DMF | vac/23 | FC98 | 1.0 | 0.3 |
| 52315 | DMF | vac/23 | BuSO$_3$Na | 1.0 | 0.2 |
| 52316 | DMF | vac/23 | BuSO$_3$Na | 1.0 | 0.2 |
| 52317 | DMF | vac/23 | BuSO$_3$Na | 1.0 | 0.3 |
| 52318 | DMF | vac/23 | BuSO$_3$Na | 1.0 | 0.3 |
| 60401 | DMSO | vac/23 | none | 3.0 | 0.00 |
| 60402 | DMSO | vac/23 | FC93 | 3.0 | 0.21 |
| 60403 | DMSO | vac/23 | FC93 | 3.0 | 0.3 |
| 60404 | DMSO | vac/23 | FC95 | 3.0 | 0.2 |
| 60405 | DMSO | vac/23 | FC95 | 3.0 | 0.31 |
| 60406 | DMSO | vac/23 | FC98 | 3.0 | 0.2 |
| 60407 | DMSO | vac/23 | FC98 | 3.0 | 0.32 |
| 60408 | DMSO | vac/23 | BuSO$_3$Na | 3.0 | 0.21 |
| 60409 | DMSO | vac/23 | BuSO$_3$Na | 3.0 | 0.3 |
| 60410 | DMSO | vac/23 | OctSO$_3$Na | 3.0 | 0.2 |
| 60411 | DMSO | vac/23 | OctSO$_3$Na | 3.0 | 0.3 |
| 61101 | DMSO | vac/75 | none | 3.0 | 0.00 |
| 61102 | DMSO | vac/75 | none | 3.0 | 0.00 |
| 61103 | DMSO | vac/75 | FC93 | 3.0 | 0.21 |
| 61104 | DMSO | vac/75 | FC93 | 3.0 | 0.21 |
| 61105 | DMSO | vac/75 | FC93 | 3.0 | 0.3 |
| 61106 | DMSO | vac/75 | FC93 | 3.0 | 0.3 |
| 61107 | DMSO | vac/75 | FC95 | 3.0 | 0.21 |
| 61108 | DMSO | vac/75 | FC95 | 3.0 | 0.2 |
| 61109 | DMSO | vac/75 | FC95 | 3.0 | 0.29 |
| 61110 | DMSO | vac/75 | FC95 | 3.0 | 0.3 |
| 61111 | DMSO | vac/75 | FC98 | 3.0 | 0.2 |
| 61112 | DMSO | vac/75 | FC98 | 3.0 | 0.2 |
| 61113 | DMSO | vac/75 | FC98 | 3.0 | 0.31 |
| 61114 | DMSO | vac/75 | FC98 | 3.0 | 0.32 |
| 61115 | DMSO | .vac/75 | BuSO$_3$Na | 3.0 | 0.19 |
| 61116 | DMSO | vac/75 | BuSO$_3$Na | 3.0 | 0.2 |
| 61117 | DMSO | vac/75 | BuSO$_3$Na | 3.0 | 0.33 |
| 61118 | DMSO | vac/75 | BuSO$_3$Na | 3.0 | 0.31 |
| 61119 | DMSO | vac/75 | OctSO$_3$Na | 3.0 | 0.19 |
| 61120 | DMSO | vac/75 | OctSO$_3$Na | 3.0 | 0.2 |
| 61121 | DMSO | vac/75 | OctSO$_3$Na | 3.0 | 0.3 |
| 61122 | DMSO | vac/75 | OctSO$_3$Na | 3.0 | 0.3 |
| 62304 | DMSO | vac/175 | FC95 | 1.0 | 0.21 |
| 62305 | DMSO | vac/175 | FC95 | 1.0 | 0.31 |
| 62306 | DMSO | vac/175 | FC98 | 1.0 | 0.21 |
| 62307 | DMSO | vac/175 | FC98 | 1.0 | 0.31 |
| 62308 | DMSO | vac/175 | BuSO$_3$Na | 1.0 | 0.2 |
| 62309 | DMSO | vac/175 | BuSO$_3$Na | 1.0 | 0.32 |
| 62310 | DMSO | vac/175 | OctSO$_3$Na | 1.0 | 0.2 |
| 62311 | DMSO | vac/175 | OctSO$_3$Na | 1.0 | 0.29 |
| 122010 | DMSO | vac/35 | FC95 | | 0.3 |

EXAMPLE 2

Small-Angle X-Ray Scattering (SAXS)

This technique has been used extensively to investigate the microstructure of ionomer membranes. SAXS peaks indicate dimensions and ordering of semicrystalline ionic cluster regions within the membrane. Since material transport occurs primarily through the ionic cluster regions, SAXS is a particularly useful technique to characterize the doped membranes of the present invention.

A 10-m, digital SAXS camera at the National Institute of Standards of Technology (Gaithersburg, Md.) was used to obtain the scattering data. The camera uses pinhole optics for the collimation of the incident beam. The source was a 12-kW rotating copper anode operated at 45 kV and 180 mA with the Cu K α line selected. The sample to detector distance was set at 2808 mm, and the two dimensional position sensitive detector was interfaced to a PDP-11 and VAX for graphics and data processing.

Small lead masks with 2-mm diameter holes were used to select homogeneous regions of the samples. The sample exposures were approximately 1 hr with additional exposures for empty beam, dark current, and reference standard. No drift was observed in the empty beam exposures.

The membrane samples were enclosed in small polypropylene (PP) bags after having soaked in deionized (DI) H$_2$O (18 mega-ohm resistance and less than 10 ppb total organic carbon) and folded. The samples were folded so that the beam passed through 4 layers of PFSA. In addition to the empty beam and polyethylene reference standard, a moist PP bag was also measured as a blank. The signal from the blank was subtracted from the radially averaged membrane sample signals.

Figure 2:
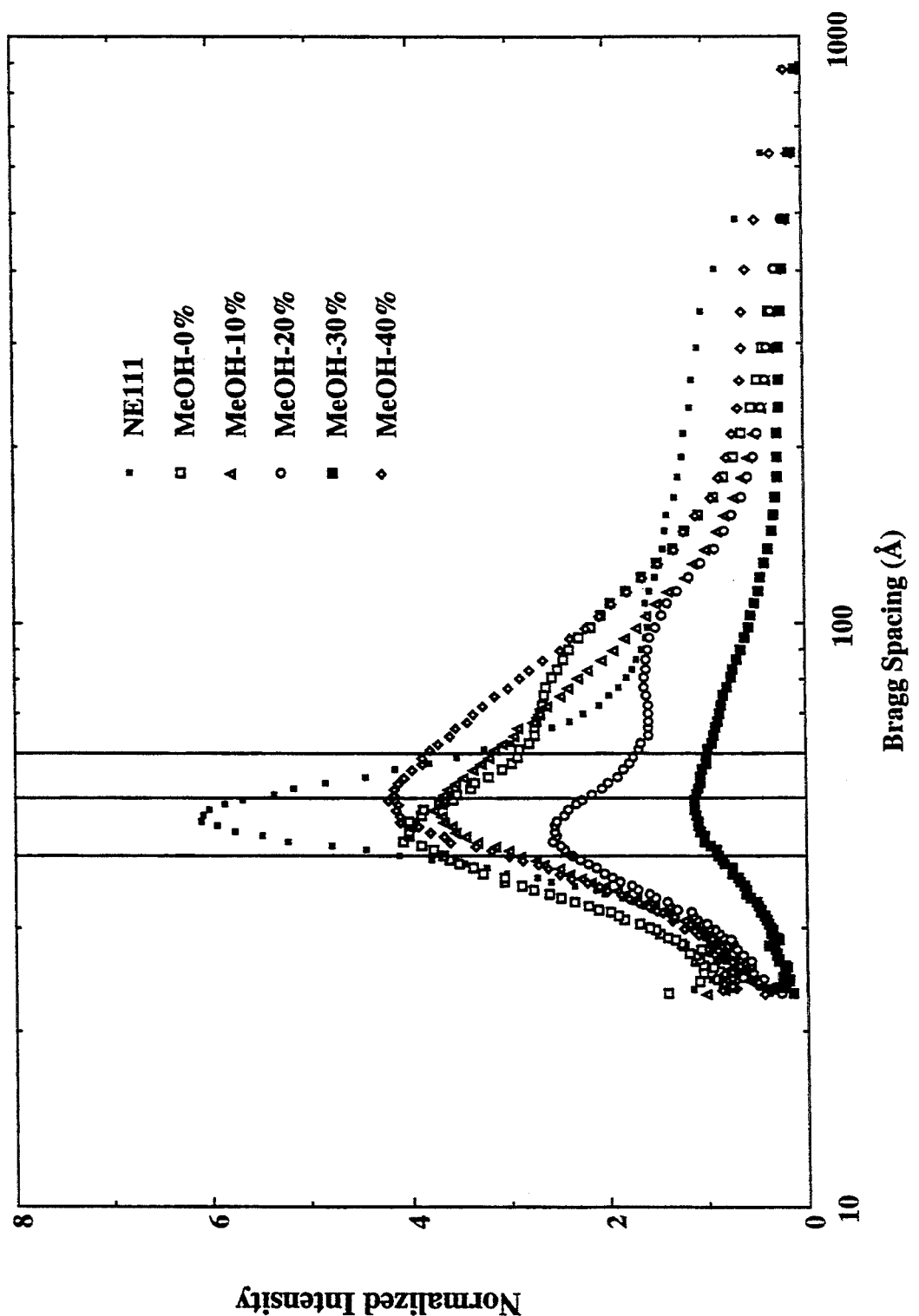
FIG. 2 shows the Lorentz-corrected X-ray scattering intensity for membranes made with MeOH as the casting solvent and FC95 as the dopant.

FIGS. 1 and 2 present a way of viewing the X-ray scattering data, called the Lorentz-corrected (or normalized) intensity versus Bragg spacing. FIG. 1 is for samples made with DMSO as the added solvent, and FIG. 2 is for samples using MeOH. The percent solids in all samples was between 1.6 and 2.8. The graph labels indicate the mol % of solids contributed by the FC95. Two samples are included that do not have dopant: NE111 is a developmental sample of Nafion ® (supplied by Dupont Co.), and the other is a sample cast with 0% dopant but the same solvent.

As seen from FIGS. 1 and 2, the doped samples show: a) a sharper peak at 40 Å, and b) substantially greater peak intensity for similar sample sizes. Both of these characteristics indicate that the dopant is causing the semi-crystalline ionic cluster regions to achieve a more ordered arrangement in the membrane microstructure.

EXAMPLE 3

Equivalent Weight Determinations

Ion-exchange experiments to determine whether the dopants were being incorporated into the membrane structure were done on three membranes: one undoped, one doped with potassium perfluoro-octane sulfonate, and one doped with sodium butane sulfonate. Equivalent weight is determined by measurement of an ion-exchange membrane's dry mass in each of two different cationic forms. The results are shown in Table 2:

TABLE 2

| Membrane Equivalent Weights | |
|---|---|
| Dopant | Membrane Equivalent Weight (g polymer/mole ion exchange sites) |
| None | 1110 |
| Potassium perfluoro-octane sulfonate | 1010 |
| Sodium butane sulfonate | 940 |

EXAMPLE 4

Vapor Permeations Measurements

Vapor phase permeation experiments were done to determine the permeability of various molecules through doped and undoped membranes. The experiment involved placing a liquid in an open-cap vial fitted with a piece of membrane sealed into the cap. The permeation rate was measured by following the decrease in vial mass over time. The steady-state permeabilities for water transport through the membrane obtained are shown in Table 3:

TABLE 3

| Membrane Water Permeability | |
|---|---|
| Dopant | $H_2O$ Permeability $\times 10^{-9}$ (mol-cm)/(cm$^2$-sec-cmHg) |
| None | 7.6 |
| FC93 | 15.0 |
| FC95 | 8.1 |
| FC98 | 12.0 |
| ButSO$_3$ | — |
| OctSO$_3$ | 15.0 |

As seen in Table 3, the permeability of water in doped samples is significantly higher than the undoped sample, indicating less resistive transport paths in the doped membranes.

Transport of a volatile non-permeating species (benzene) was also measured to verify that the membranes had no significant pinholes. The average benzene permeability for all samples was $5 \times 10^{-13}$ mol-cm/cm$^2$-sec-cm Hg.

EXAMPLE 5

Structure-Function Relationships

Water and isopropanol vapor permeation experiments were conducted with the membranes of Example 2. The results of those tests are shown in Table 4:

TABLE 4

| | | Water and Isopropanol Vapor Permeation | | |
|---|---|---|---|---|
| Solvent | % FC-95 | Isopropanol | $H_2O$ | $H_2O$/Isopropanol |
| | | ($\times 10^{-7}$ mol-cm/cm$^2$ min) | | |
| DMSO | 0 | 0.11 | 0.71 | 6.35 |
| DMSO | 10 | 0.04 | 0.85 | 19.47 |
| DMSO | 20 | 0.08 | 0.62 | 8.06 |
| DMSO | 30 | 0.25 | 0.82 | 3.27 |
| DMSO | 40 | 0.37 | 0.83 | 2.26 |
| DMSO | 60 | 0.10 | 0.43 | 4.25 |
| MeOH | 0 | 0.11 | 0.34 | 3.15 |
| MeOH | 10 | 0.05 | 0.54 | 10.19 |
| MeOH | 20 | 0.05 | 0.82 | 16.44 |
| MeOH | 30 | 0.11 | 0.73 | 6.69 |
| MeOH | 40 | 0.27 | 1.01 | 3.79 |
| NE111 | 0 | 0.12 | 0.69 | 5.79 |

These data show significant variations in both the amount and ideal ratio of water or isopropanol that permeate the membranes. Ideal ratio ($H_2O$/isopropanol) is a measure of the selectivity of membrane permeability. Table 4 shows that the addition of dopant significantly alters permeability, with the biggest improvement in ideal water selectivity versus isopropanol is seen in samples with 10% and 20% dopant.

We claim:

1. A method of producing a nonporous perfluorinated ion-exchange membrane comprising:
    a) mixing a perfluorinated polymer solution with an ionic surfactant solution such that said ionic surfactant comprises 1-60 mol % of total solids;
    b) casting said perfluorinated polymer-surfactant mixture to produce a nonporous perfluorinated film membrane, such that said surfactant is incorporated into the microstructure of the nonporous perfluorinated film membrane.

2. The method of claim 1 wherein said polymer solution is comprised of 0.5-5% weight/weight (w/w) polyperfluorosulfonic acid (PFSA) in solution.

3. The method of claim 2, wherein said polymer solution is comprised of PFSA dissolved in an organic solvent.

4. The method of claim 3 wherein the organic solvent is selected from a group consisting of dimethyl sulfoxide, methanol, and dimethylformamide.

5. The method of claim 1 wherein said surfactant solution is comprised of 0.1-3.0% (w/w) surfactant dissolved in an organic solvent.

6. The method of claim 5, wherein said surfactant solution is comprised of a surfactant dissolved in an organic solvent. wherein said surfactant solution is comprised of a surfactant dissolved in water.

7. The method of claim 5 wherein the organic solvent is selected from a group consisting of dimethyl sulfoxide, methanol, and dimethylformamide.

8. The method of claim 1 wherein said surfactant is potassium perfluoro-octane sulfonate.

9. The method of claim 1 wherein said surfactant is ammonium perfluoro-octane sulfonate.

10. The method of claim 1 wherein said surfactant is potassium perfluoro-alkylcyclohexyl sulfonate.

11. The method of claim 1 wherein said surfactant is sodium butane sulfonate.

12. The method of claim 1 wherein said surfactant is sodium octane sulfonate.

13. A perfluorinated ion-exchange membrane prepared according to the method of claim 12 having improved transport characteristics.

14. The method of claim 1, wherein said polymersurfactant solution is cast, evaporated to dryness, and then heated.

15. The method of claim 1 comprising in addition the curing of said film.

16. The method of claim 1, wherein said evaporated solution is heated at 175° C. for 2 hours.

17. A perfluorinated ion-exchange membrane prepared according to the method of claim 1 having improved transport characteristics.

18. The perfluorinated ion-exchange membrane of claim 17 comprising in addition the step of curing said film.

19. A method for improving the transport properties of perfluorinated ion-exchange membranes comprising:
  a) mixing a perfluorinated polymer solution with an ionic surfactant solution such that said ionic surfactant comprises 1–60 mol % of total solids; and
  b) forming said perfluorinated polymer-surfactant mixture into a nonporous perfluorinated film membrane, such that said ionic surfactant is incorporated into the microstructure of said nonporous perfluorinated film membrane.

20. A method for increasing the ion-exchange site density of perfluorinated ion-exchange membranes comprising:
  a) mixing a perfluorinated polymer solution with an ionic surfactant solution such that said ionic surfactant comprises 1–60 mol % of total solids;
  b) evaporating said perfluorinated polymer-surfactant mixture to produce a nonporous perfluorinated film membrane, such that said ionic surfactant is incorporated into the microstructure of said nonporous perfluorinated film membrane.

21. A perfluorinated ion-exchange membrane prepared according to the method of claim 20 werein the surfactant molecules are selected from a group consisting of potassium perfluoro-octane sulfonate, ammonium perfluoro-octane sulfonate, potassium perfluoro-alkylcyclohexyl sulfonate, sodium butane sulfonate, and sodium octane sulfonate.

* * * * *